United States Patent [19]

Lavorel

[11] Patent Number: 4,706,369

[45] Date of Patent: Nov. 17, 1987

[54] FAST-ACTION MULTIPLE TAPPING MACHINE

[75] Inventor: Gerard Lavorel, Pringy, France

[73] Assignee: Ateliers de Decoupage, Emboutissage et Mecanique de la Vallee de l'Arve ADEMVA, Societe Anonyme, Cluses, France

[21] Appl. No.: 828,840

[22] Filed: Feb. 12, 1986

[30] Foreign Application Priority Data

Feb. 12, 1985 [FR] France .................. 85 01948

[51] Int. Cl.$^4$ .................. B23G 1/20; B23G 3/00
[52] U.S. Cl. .................. 29/560; 10/129 A; 29/57; 408/30; 408/98
[58] Field of Search .................. 408/56, 98, 125, 126, 408/137, 138, 30, 53; 29/57, 560; 10/129 R, 129 A, 136 R

[56] References Cited

U.S. PATENT DOCUMENTS

| | | | |
|---|---|---|---|
| 2,314,138 | 3/1943 | Garbe et al. | 10/136 R X |
| 2,346,297 | 4/1944 | Garbe | 10/129 R X |
| 2,715,233 | 8/1955 | Clark | 408/56 |
| 3,162,873 | 12/1964 | Ohme | 408/98 |
| 4,473,330 | 9/1984 | Chalier | 408/98 |

*Primary Examiner*—Z. R. Bilinsky
*Attorney, Agent, or Firm*—Karl F. Ross; Herbert Dubno; Andrew Wilford

[57] ABSTRACT

A tapping machine has a base plate fixed to one of the platens, a spindle extending along a spindle axis between the platens in the closing direction of the press actuating the machine, and a nut threaded on the spindle. The nut is normally rotatable about the spindle axis on the base plate and the spindle is fixed nonrotatably about the spindle axis on the other platen so that relative displacement of the platens rotates the nut in the base plate. An element displaceable on the base plate along an element axis but nonrotatable on the base plate about the element axis carries a plurality of tap holders generally fixed relative to the element axis in the element and rotatable in the element about respective tap axes parallel to the element axis. Respective taps are fixed axially and rotationally in the holders. A rotary transmission is provided that operatively connects the rotary nut and the holders for synchronously rotating the holders and their taps at a predetermined tap rotation rate about the tap axes on rotation of the nut about the spindle axis. An addition an axial-feed transmission connects the rotary nut and the element for synchronously axially advancing the element with the taps and tap holders on displacement of the platens from the outer position to the inner position through a predetermined tap stroke equal to a fraction of the press stroke and at a rate such that the taps are rotated through substantially only one revolution while being advanced through a distance equal to the pitch.

9 Claims, 10 Drawing Figures

FAST-ACTION MULTIPLE TAPPING MACHINE

FIELD OF THE INVENTION

The present invention relates to an automated tapping machine. More particularly this invention concerns such a machine which simultaneously taps a plurality of holes in a workpiece in a production line.

BACKGROUND OF THE INVENTION

It is necessary in the production of many machine parts to first bore a plurality of holes in a normally metallic workpiece and thereafter to thread these holes. Prior to these operations the workpiece can be cut from a larger piece and subsequent to them it can be subject to further operations, such as embossing or finishing.

It is standard in production-line machining to use presses at the various stages, adapted to normally also serve for functions like shearing or embossing. For tapping the taps are carried in respective rotary chucks or holders carried on a base plate fixed to one of the two press platens. The chucks are provided with respective drive gears or pinions that are interconnected, typically by a chain, so that they can all be rotated about their respective axes by a transmission having an input nut or screw that is centered on and rotatable about an axis perpendicular to the closing direction of the press. The other platen of the press carries a threaded member that fits with the screw or nut and that itself is nonrotatable so that as the two platens move together this straight-line movement is converted into a rotation of the chucks holding the taps. Such machines are limited to tapping in the normally vertical direction the presses operate, so that a workpiece that must be laterally horizontally tapped will have to be turned before entering the tapping machine. In addition the manner of driving the individual tap holders ordinarily precludes spacing them too closely, less than 40 mm on center.

As described in French patent No. 2,495,979 the chucks are each normally of two parts that can move relative to each other along the respective axis, but that are rotationally linked. The part in which the tap is fixed is biased outward, that is toward the workpiece, by a relatively soft spring. Thus the press closes at the tapping station to advance all the taps toward the workpiece, and pushes them into the respective holes. Meanwhile of course the taps are being rotated. Until each tap bites into the respective hole, the compression of the respective spring allows the base plate to continue to move forward, and thereafter the tapping proceeds at a rate determined exclusively by the pitch and rotation rate of the tap. As the press opens, the rotation of the taps is reversed. Hence the tap rotation rate must be set to be fast enough to complete the short stroke of the tapping operation but not so fast as to overrun the advance of the base plate on outward movement into the workpiece. On the other hand it must not be so slow that the tap advance rate is less than the press return rate to prevent binding in the hole and stripping of it on opening of the press.

It has in fact been learned and will be discussed in more detail below that the cycling rate of a tapping machine, that is the time it takes from a given starting position to tap a group of holes and then return to this starting position, is substantially slower than that of many other production-line machines. A shear or embossing machine can often cycle several times a second or at the slowest once per second, but a standard tapping machine cannot normally cycle even once in a second. The result is therefore a duplication of this equipment so that half the tapping is done at one location and the other half at another, or a slowing of the whole production line to the rate of the one tapping machine.

OBJECTS OF THE INVENTION

It is therefore an object of the present invention to provide an improved multiple tapping machine usable in a press.

Another object is the provision of such a multiple tapping machine which overcomes the above-given disadvantages, that is which can cycle rapidly, which can also tap transverse to the press displacement direction if necessary, and whose taps can be closely spaced.

SUMMARY OF THE INVENTION

A tapping machine according to the invention has a base plate fixed to one of the platens of a press used to operate and drive the machine, a spindle member extending along a spindle axis between the platens in the direction, and a nut member threaded on the spindle member. One of the members is rotatable about the spindle axis on the base plate and the other member is fixed nonrotatably about the spindle axis on the other platen so that relative displacement of the platens rotates the one member in the base plate. An element displaceable on the base plate along an element axis but nonrotatable on the base plate about the element axis carries a plurality of tap holders generally fixed relative to the element axis in the element and rotatable in the element about respective tap axes parallel to the element axis. Respective taps are fixed axially and rotationally in the holders. A rotary transmission is provided that operatively connects the rotary one member and the holders for synchronously rotating the holders and their taps at a predetermined tap rotation rate about the tap axes on rotation of the one member about the spindle axis. An addition an axial-feed transmission connects the rotary one member and the element for synchronously axially advancing the element with the taps and tap holders on displacement of the platens from the outer position to the inner position through a predetermined tap stroke equal to a fraction of the press stroke and at a rate such that the taps are rotated through substantially only one revolution while being advanced through a distance equal to the pitch.

Thus with this invention the portion of the cycle of the press that is used for the actual tapping operation can be increased by at least three times. The conversion of the long displacement of the press platens to a short displacement of the taps means that they move axially much more slowly so that, even with a rotation speed well below the maximum permissible speed, it is possible to operate the press at its maximum speed. Furthermore the positive axial advance of the taps ensures that they will bite into and thread the respective holes without any substantial slipping.

According to a feature of this invention each holder comprises an inner part holding the respective tap and an outer part. The inner parts are displaceable axially backward along the respective tap axes relative to the respective outer parts from positions with the inner parts engaging axially outward against the outer parts. In addition the machine has springs pressing the inner parts axially outward against the respective outer parts with a force exceeding the opposite force created during tapping. These springs are only compressed, with relative movement of the respective holder parts, when the tap is pressed against a workpiece at a location where there is no hole to tap. Otherwise the spring force is sufficient to prevent any substantial relative movement of the respective holder parts when the respective tap fits into a hole it can thread.

In accordance with another feature of this invention the axial-feed transmission includes an internally threaded drive sleeve in continuous-mesh engagement with the nut and an external thread on the element centered on the axis and engaging the internal thread of the drive sleeve. Furthermore, the rotary transmission includes respective drive teeth formed on the holders, and internal drive teeth formed on the drive sleeve and meshing with the teeth of the holders.

It is also possible for the base plate according to this invention to have an auxiliary plate engageable with a workpiece to be tapped and provided with means permitting the auxiliary plate to move relative to the base plate through a predetermined distance axially of the taps. A spring is provided to urge the auxiliary plate away from the base plate. The taps are engageable through the auxiliary plate with the workpiece. Further springs can be provided for urging the holder axially outward toward a workpiece on the base plate.

It is also possible according to this invention for the axial feed transmission means to have an internal thread formed in the element, and an externally threaded drive member in continuous-mesh engagement with the nut and meshing with the internal thread of the element. In this case the rotary transmission means includes respective drive teeth formed on the holders, and external drive teeth formed on the drive member and meshing with the teeth of the holders.

In another arrangement according to the invention the axial feed means includes a cam having an inclined camming surface engageable with the element, a spring urging the element axially back against the camming surface, and an eccentric drive member having a surface bearing on the cam and in continuous-mesh engagement with the nut. The cam itself can be spring-biased into engagement with the eccentric surface of the drive member.

The system of this invention is extremely compact and can tap holes as small as 1.5 mm in diameter and spaced as closely as 10 mm. Furthermore the relatively compact construction keeps its inertia low so that wear is minimal. Mounting the base plate on the bottom platen of the press also makes the machine easily exchangeable when the production line is being retooled, even with leaving the spindle or nut on the upper platen.

DESCRIPTION OF THE DRAWING

The above and other features and advantages will become more readily apparent from the following, it being understood that any feature described with reference to one embodiment of the invention can be used where possible with any other embodiment. In the accompanying drawing.

SPECIFIC DESCRIPTION

Figure 1:
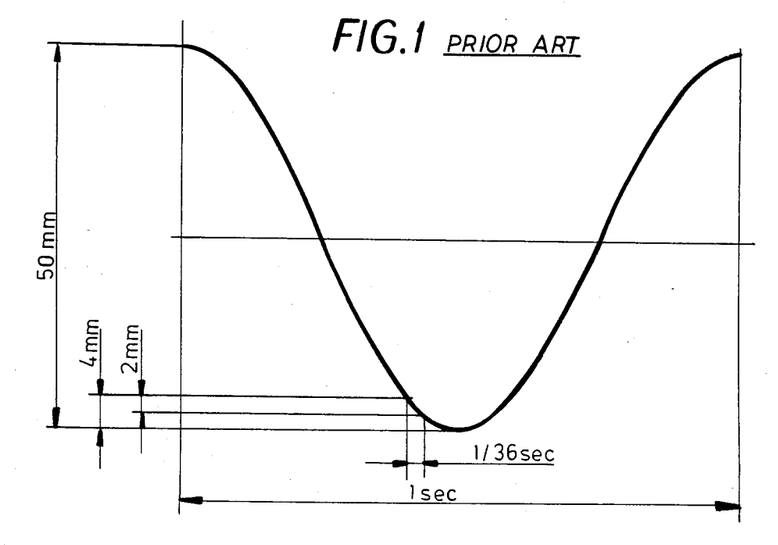
FIGS. 1 and 2 are diagrams plotting time against displacement for machines respectively according to the prior art and according to this invention.

FIG. 1 is a plot of time on the abscissa against stroke on the ordinate for a prior-art machine. In this device the movable press platen has a total stroke of 50 mm and is used to tap a 2 mm thick workpiece and to push the end of the tap at most some 2 mm through the workpiece. As a result with the illustrated 1 stroke/sec cycle the amount of time spent actually tapping is reduced to about 1 sec/36.

When a 3 mm diameter hole is being tapped at a 0.5 mm pitch with a conventional machinist's tap the maximum nominal tapping speed is about 45 m/min. Thus the maximum rotation speed is figured as:

$$(45,000 \text{ mm/min})/(3 \text{ mm} \cdot 3.14) = 4780 \text{ rev/min.}$$

This speed is therefore the fastest speed at which the machine can be operated without damaging the tap and represents therefore the operating speed one should aim at for maximum time efficiency.

On the other hand, that is figuring the tap speed from the 1 sec cycle time for the press, with a 0.5 mm pitch the tap must rotate four times to cut through a 2 mm thick workpiece so that in 1 sec/36 it is necessary for the tap to move 4 rev. The rotation rate that is produced by such operation is:

$$4 \text{ rev} \cdot 36/\text{sec} \cdot 60 \text{ sec/min} = 8640 \text{ rev/min.}$$

This is obviously much faster than the maximum of 4780 rev/min which can be used without damaging the tap, so the 1 stroke/sec (60 stroke/min) press cycle must be slowed down in accordance with:

$$(4780/8640) \cdot 60 \text{ stroke/min} = 33 \text{ stroke/min.}$$

Clearly this represents an unwarranted slowing of the production operation, one at least halving efficiency at this stage.

Figure 2:
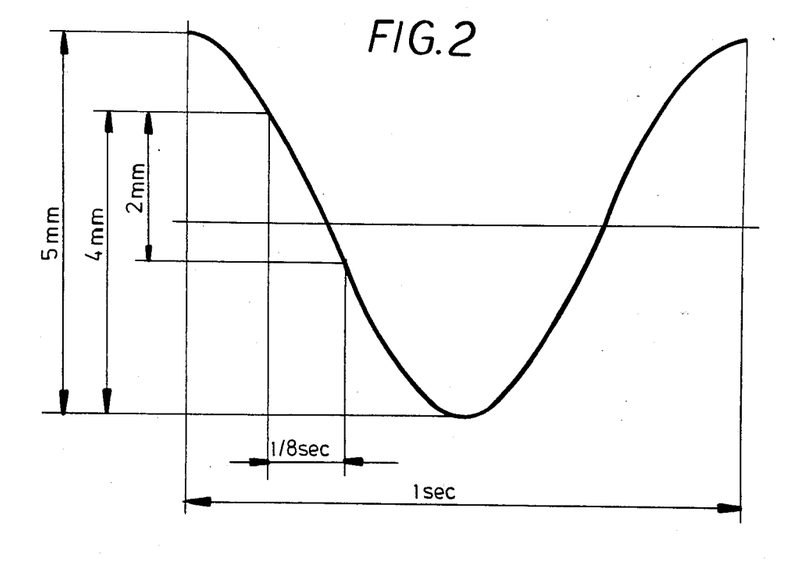

FIG. 2 illustrates how the machine according to the instant invention overcomes this problem by converting the 50 mm stroke of the press into a 5 mm positive-action stroke of the tap. The 2 mm of actual tapping work therefore takes 1 sec/8, some 4.5 times longer than in the prior-art system, allowing for a 1 mm stroke before the workpiece is engaged, 2 mm of actual tapping, and 2 mm of movement of the tap through and past the workpiece.

More particularly, the instant invention allows the four revolutions that do the actual tapping to be done over a long enough period to allow for a fairly leisurely tap rotation rate, figured as follows:

4 rev·8/sec·60 sec/min=1920 rev/min.

On the other hand, figuring the cycling speed based on the maximum tap speed gives:

(4780/1920)·60 strokes/min=149 strokes/min.

This means that the system of this invention can work at the maximum tapping speed for use of the tapping machine in a high-speed line. Rather than 33 strokes/min the press can operate 4.5 times faster at 149 strokes/min, something that the standard shear or embossing press can do easily.

Figure 3:
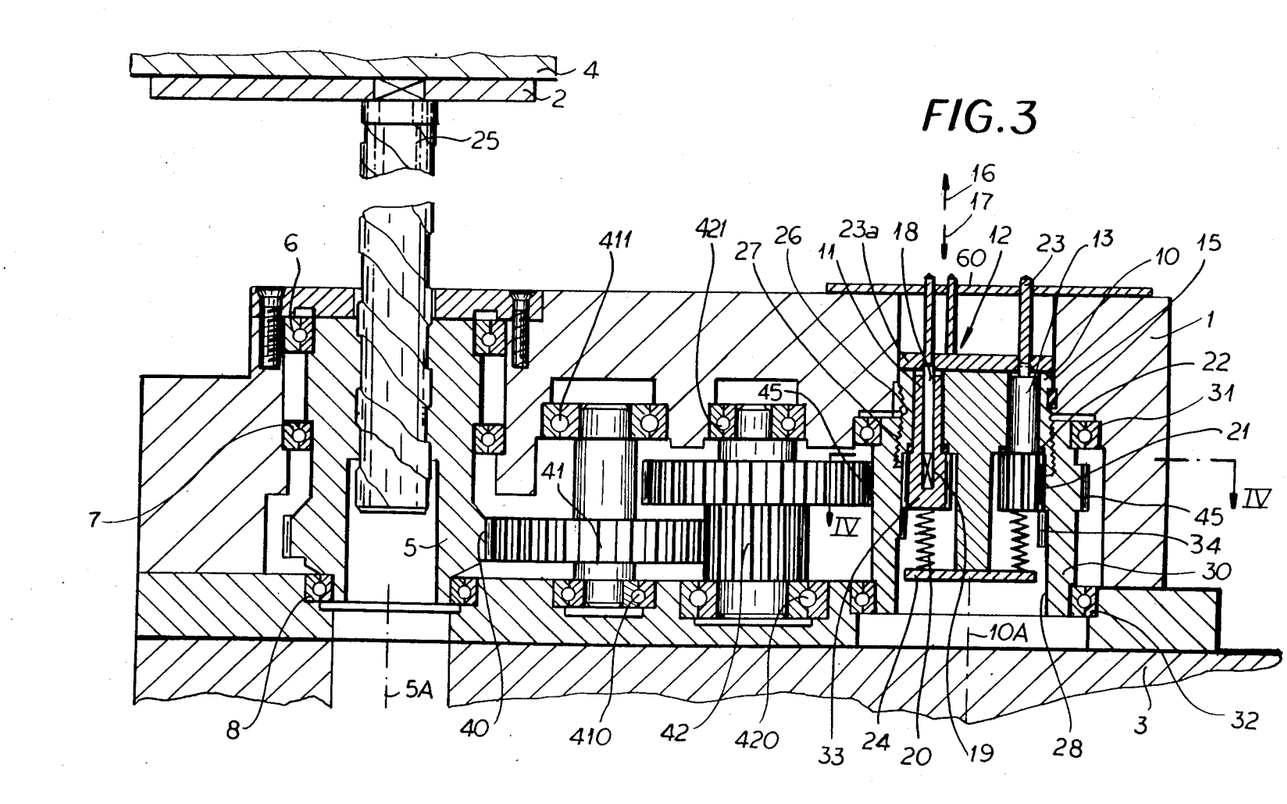
FIG. 3 is a vertical section through a first embodiment of the instant invention.
Figure 4:
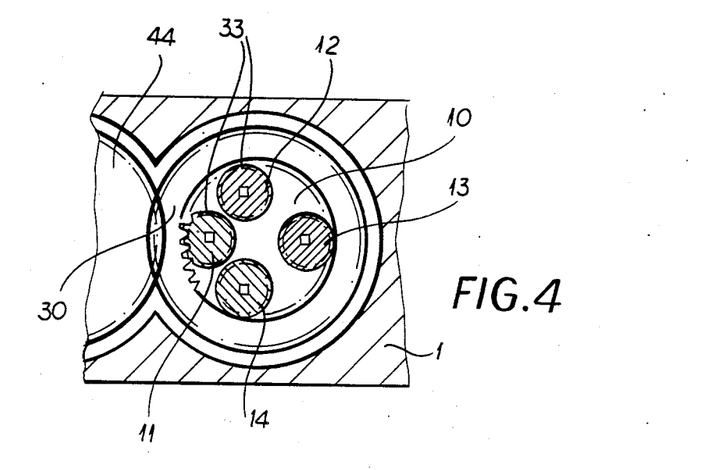
FIG. 4 a horizontal section taken along line IV—IV of FIG. 3.

As seen in FIGS. 3 and 4 a tapping machine according to this invention comprises a normally stationary support or base plate 1 fixed on the lower platen 3 of a press and provided with a nut 5 supported by bearings 6, 7, and 8 for rotation about a vertical axis 5A. A spindle 25 centered on the axis 5A is fixed at a plate 2 to the upper platen 4 which can be moved vertically along the axis 5A through the stroke of 50 mm toward and away from this lower platen 3. These plates 3 and 4 can be part of a standard shear or embossing press. The interfitting screwthread of the nut 5 and screw 25 are bidirectional so they do not bind but merely transform the reciprocal motion of the upper platen 4 into a rotation of the nut 2, typically at a sinusoidally increasing and decreasing rate.

According to this invention four substantially identical tap holders 11, 12, 13, and 14 are carried in bores in a single holder element 10, with the tap holders 11-14 defining respective axes parallel to an axis 10A of the element 10. The tap holders 11-14 are rotatable in the holder element 10 about their respective axes and have respective axially centered bores 18 terminating in flatted seats 19 that receive the rear ends of taps 23 so that these taps 23 are locked axially and rotationally in their holders 11-14. In addition each of the holders 11-14 bears axially outward (here upward) on the inner race of a roller bearing 22 whose outer race is seated in the element 10. A seal plate 23A overlies the outer face of the element 10. Very stiff compression springs 20 are braced axially between the rear ends of the holders 11-14 and a plate 24 carried on the element 10 so that, if necessary, the taps 23 can push back into the element 10. Such action is only needed if the workpiece is misaligned or for another reason there is no hole for a tap to fit into when the machine is used.

The rear ends of the holders 11-14 are formed with gears or pinions 33 that all mesh with an internal toothing 34 of a sleeve 30 in the plate 1 for rotation about the axis 10A by bearings 31 and 32. Thus rotation of the sleeve 30 about the axis 10A will rotate the taps 23 all in the same direction about their respective axes.

The element 10 is held in the base plate 1 against rotation about its axis 10A by a key 15, but can move relative thereto along this axis 10A. Such movement is effected by a screwthread 26 formed on the outside of the element 10 and a screwthread 27 on the inside of the sleeve 30. Thus rotation of the sleeve 30 about the axis 10A will also axially advance the taps 23 all in the same direction along their respective axes parallel to the axis 10A.

The sleeve 30 forms a dual-function output member of a transmission also formed by an input gear 41 meshing on one side with a main drive gear 40 on the nut 5 and carried in bearings 410 and 411 and on the other side with a gear 42 fixed with a gear 44 meshing with teeth 45 on the outside of the sleeve 30, with bearings 420 an 421 supporting the unitary gears 42 and 44. The pitch of the screwthreads and the stepdown of the gearing is such that two relationships pertain:

A. The taps 23 are only advanced through a stroke of 5 mm when the platen 4 moves relative to the platen 3 through a stroke of 50 mm. Thus the straight-line/rotational force converter formed by the interfitting screw 25 and nut 5 are backed up by a ten-to-one reduction stage formed by gears 41, 42, and 44 and then by a rotational/straight-line force converter formed by the screwthreads 26 and 27 so that the sleeve 10 moves in a straight line through a stroke that is one tenth that of the platen 4. This relationship is a function of the diameters of the gears 40, 41, 42, 44, and 45 and of the pitch of the screwthreads 26 and 27.

B. Each tap 23 is rotated one full turn each time the element 10 is advanced along the axis 10A through a distance equal to the pitch of the tap. This relationship is a function of the gear diameters.

As a result when the press closes the rotating taps 23 are advanced outward in direction 16 through a distance of 1 mm before contacting the workpiece 60 lying atop the plate 1. The positively axially fed taps 23 immediately bite into the respective bores since the springs 20 are very stiff and they are being advanced at the pitch rate, so they move 2 mm through the workpiece 60 while cutting threads, then 2 mm past it. The press then opens and the procedure is automatically reversed with the taps 23 being screwed out of the holes while being retracted in direction 17.

Furthermore with this system it is possible to simultaneously tap holes of different diameter and/or pitch. Presuming the system described above was also to tap a hole 4 mm in diameter at 0.75 mm pitch, it is merely necessary to use a gear 33 on the respective holder with the right number of teeth. Thus if the gears 33 of the 0.5 mm pitch holders each have ten teeth, those of the gear 33 for the 0.75 mm pitch holder should have 15. Thus during the advance of the element 10 through, for example, 1.5 mm the holders of the 0.5 mm pitch taps will rotate three times and those of the 0.75 mm pitch tap will rotate twice.

Figure 5:
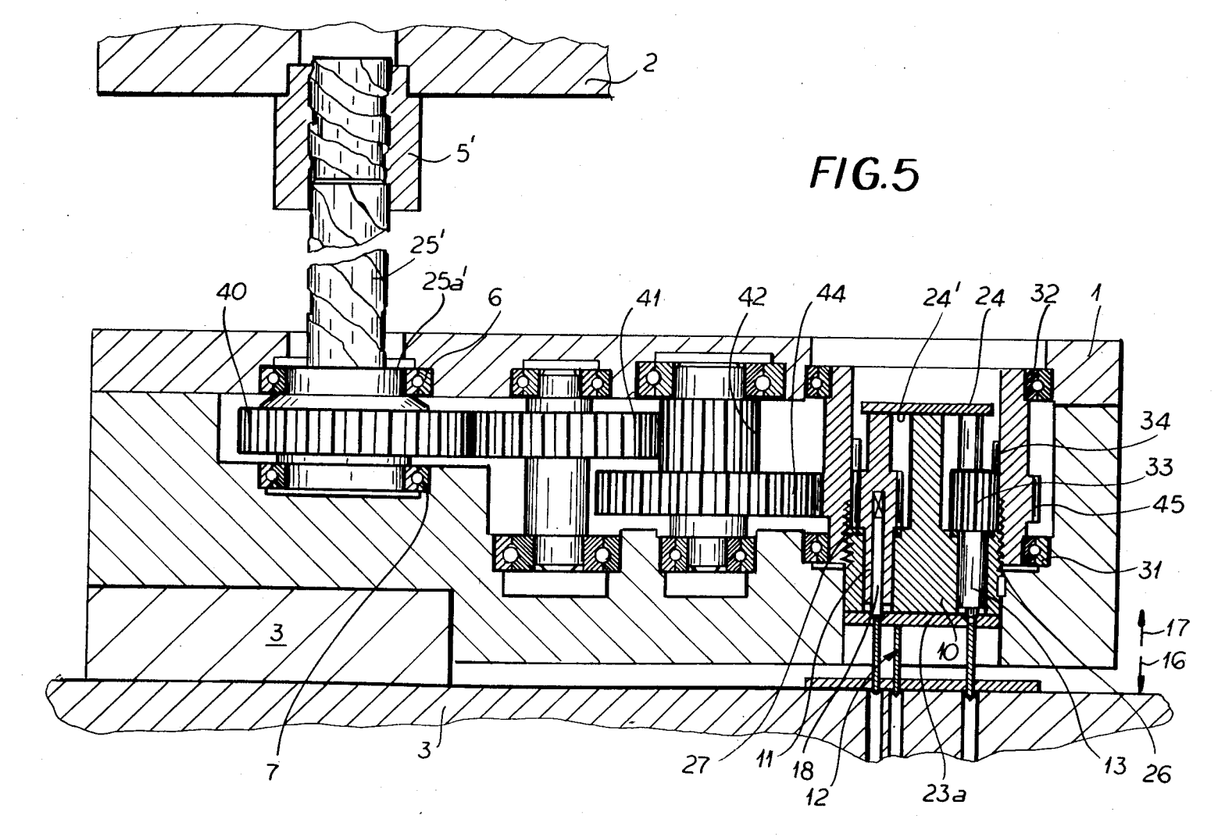
FIG. 5 is a section like FIG. 3 through a second embodiment of the machine according to this invention.

The arrangement of FIG. 5, where reference numerals identical to those of FIGS. 3 and 4 are used for identical structure, differs in two main respects from the system of FIGS. 3 and 4. First of all a stationary nut 5' is mounted in the platen 2 and a spindle 25' is carried in a rotary member 25' itself formed with the input gear 40. This therefore represents a kinematic reversal of the parts 5 and 25. In addition in FIG. 5 the vertical orientation of the element 10 and its associated structure including the taps 23 is reversed. Thus this arrangement taps downward rather than upward.

Figure 6:
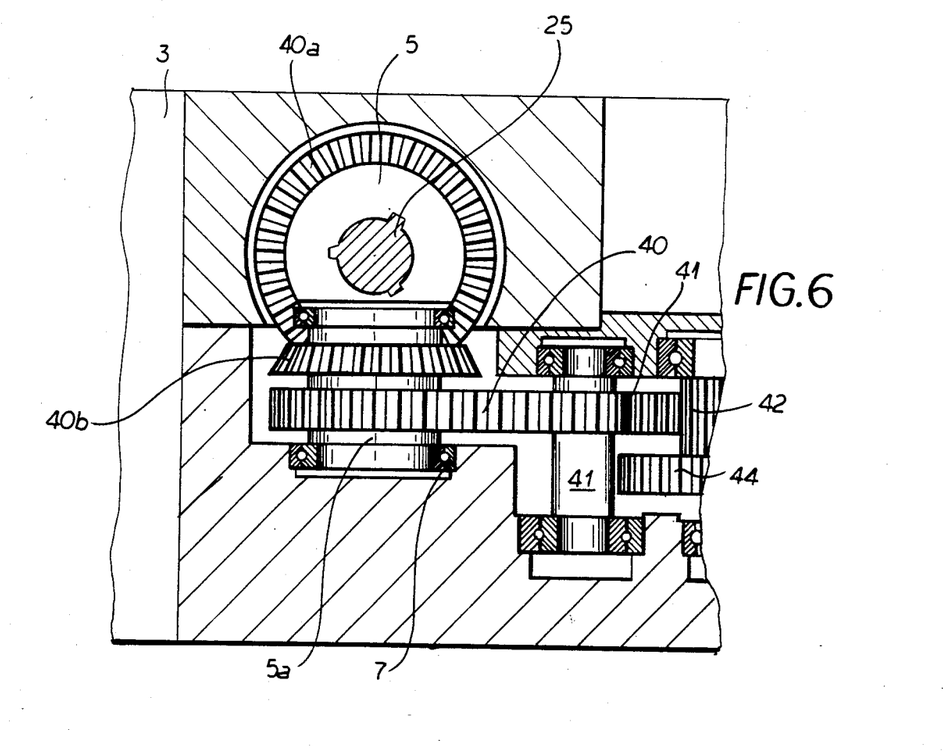
FIG. 6 is a vertical section likes FIGS. 3 and 5 through a variation on the drive of the system of this invention.

In FIG. 6 the nut 5 and spindle 25 are arranged so that their axis 5A is perpendicular to the axes of the unillustrated taps. The nut 5 is thus provided with a bevel gear 40a meshing with another bevel gear 40b on a member 4a carrying the transmission input gear 40, thereby forming a right-angle drive.

Figure 7:
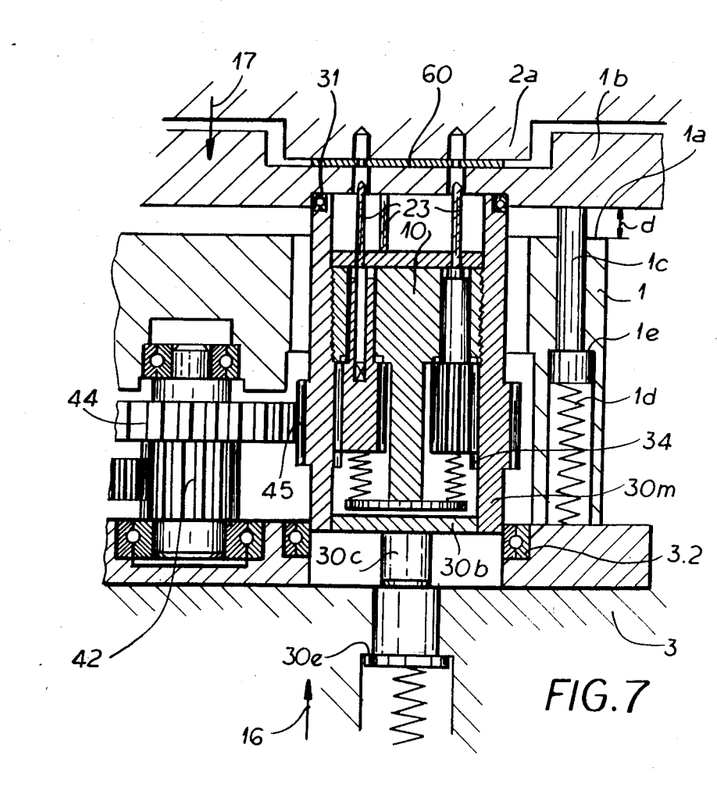
FIG. 7 is a vertical section through the tapping unit of a third embodiment of the system of the present invention.

FIG. 7 shows a variation on the system of FIGS. 3 and 4. The hollow holder element 30 of FIG. 3 is here replaced with a sleeve 30 m having a base 30b supporting an extension 30c. A spring 30d continuously biases the sleeve 30m in the outward direction 16.

The movement of the sleeve 30m is limited in the direction 16 by a shoulder 30e formed on the extension 30c which is here of two parts and engageable with the stationary lower platen 3 to a position with the upper end of the sleeve 30 and the upper surface of the base plate 1. In turn the upper surface of the base plate 1 is spaced a distance d below the lower surface of a supplementary base plate 1b on which the workpiece 60 sits, being held in place by a projection 2a of the plate 2. Several guide pins 1c vertically slidable in the base plate 1 are fixed in the plate 1b and have shoulders 13 defining the illustrated uppermost position of the plate 1b, with springs 1d urging them into this position. At least one such further pin is provided offset from the axis of the holder 10 and engaging between the plate 1b and the holder 10 to prevent it from rotating. Such a spring-biased plate 1b is useful when workpieces of different thicknesses must be tapped.

Such an arrangement is particularly effective in that it allows the tapping to be done during most of the time the workpiece is actually clamped in the press. Tapping can in fact only take place when the press is closing and will automatically finish as it opens, so breaking off the taps with a moving workpiece is impossible.

Figure 8:
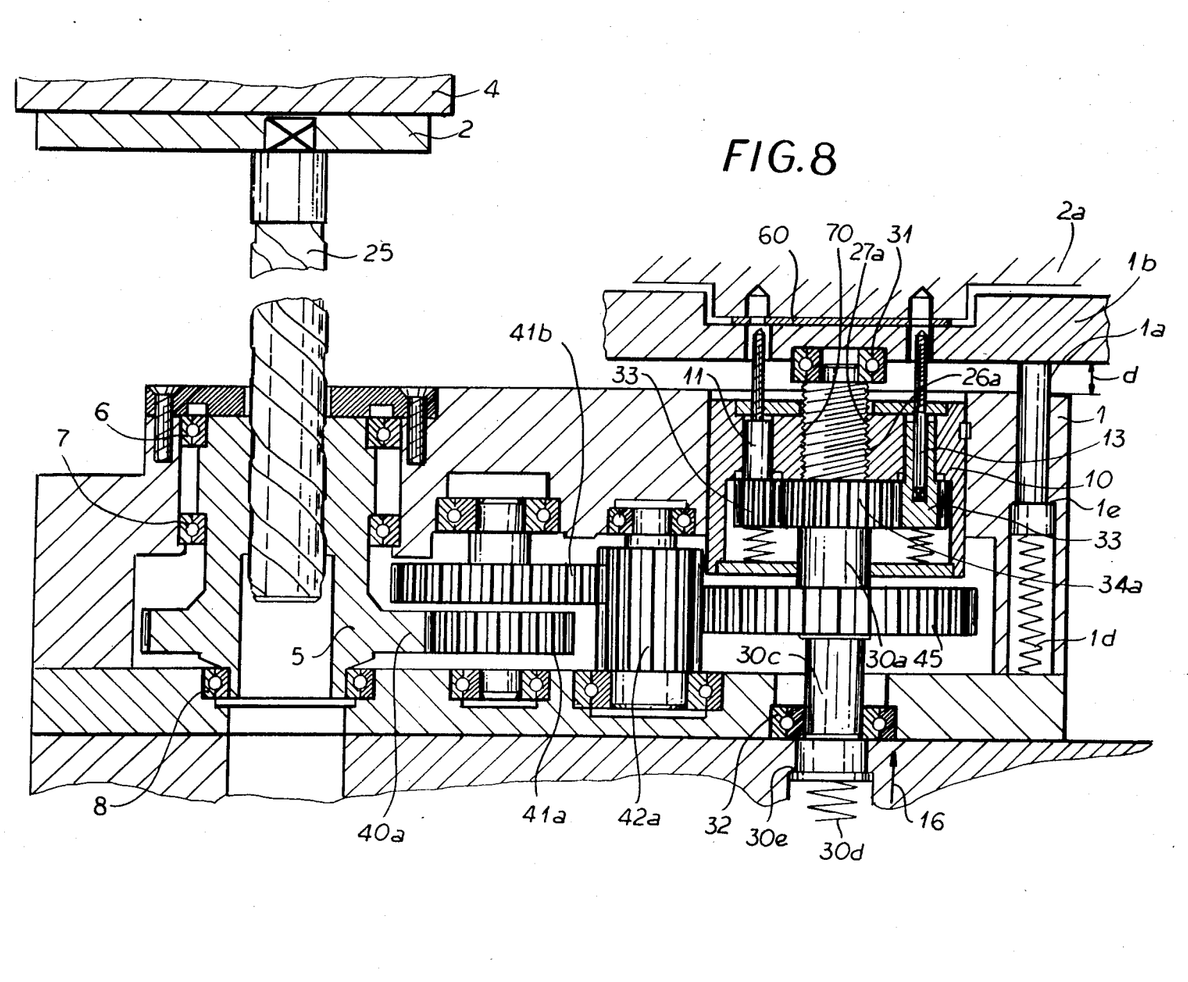
FIGS. 8 and 9 are sections like FIGS. 3 and 5 through a fourth machine according to the invention with the parts respectively in the inner and outer positions.
Figure 9:
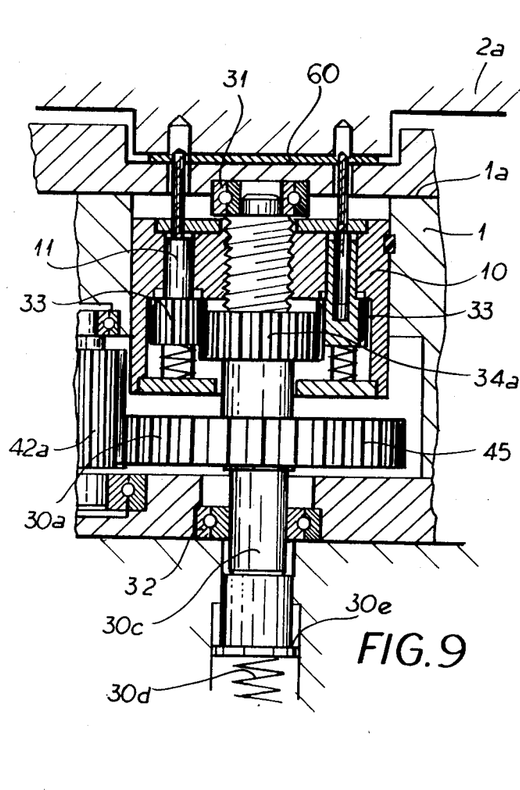

In FIGS. 8 and 9 a central nontubular element 30a replaces the drive sleeves, having an external thread 27a meshing with an internal thread 26a formed in a central bore 70 of the cylindrical holder 10 for the holders 11–14. This element 30a carries a pinion 34a that meshes with the gears 33 of the holders 11–14 and another gear 45a meshing with a transmission gear 42a itself meshing with a large-diameter gear 41b fixed to a small-diameter gear 41a meshing with the gear 40a of the nut 5.

The arrangement of FIGS. 8 and 9 is somewhat easier to manufacture, avoiding the difficulty of forming the internal gearing 34. In addition it is lighter than the arrangement of FIGS. 3 and 4 as regards its moving parts, for less inertia. Furthermore, guiding the sleeve 30a is easier than the sleeve 30 because it is centrally driven and smaller.

Figure 10:
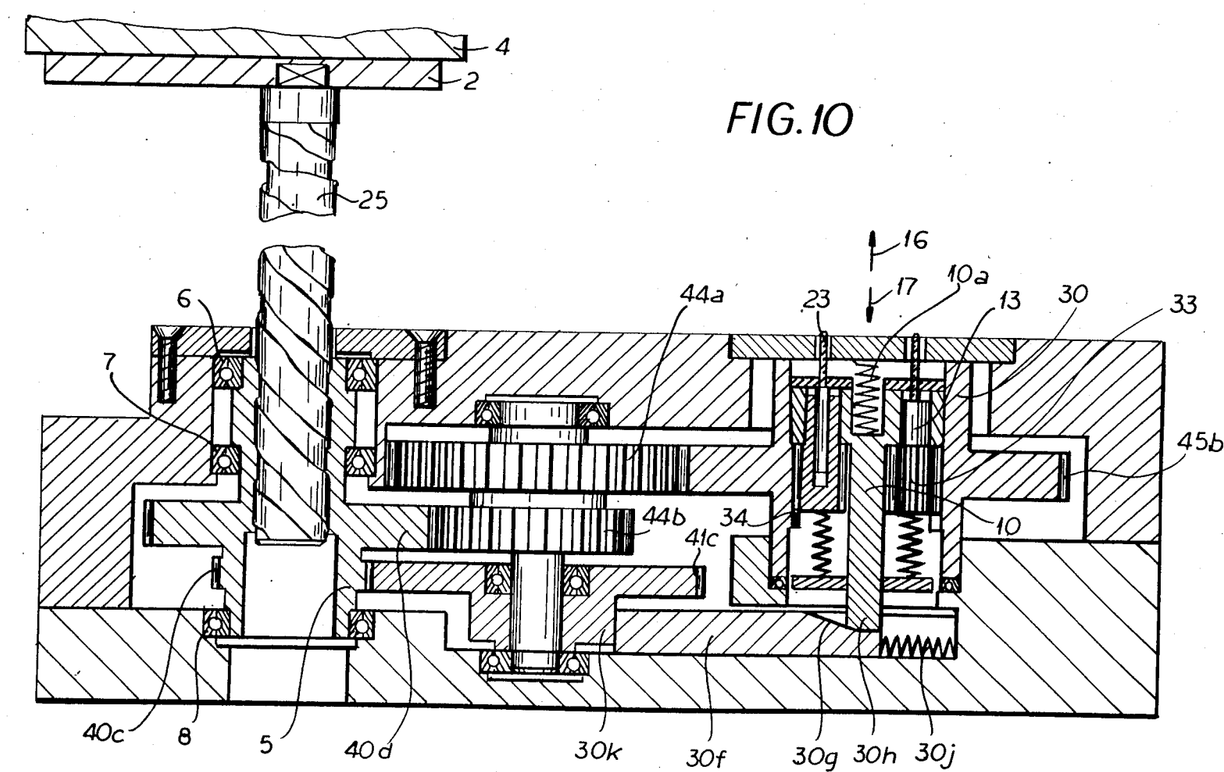
FIG. 10 is a section like FIG. 7 through the tapping unit of a fifth tapping machine in accordance with the present invention.

In the arrangement of FIG. 10 the element 10 is not threaded at all but instead is moved axially by a cam arrangement. More particularly a cam 30f having an inclined camming surface 30g is engageable with the rear end 30h of the holder 10, which itself is biased inward, that is in direction 167, by a spring 10a. On the one hand a spring 30j urges the cam 30f into a position corresponding to the inner position of the holder 10, pressing it against an eccentric cam 30k carried on a gear 41c meshing with an individual drive gear 40c of the nut 5. Thus an independent transmission is provided to actuate the holder 10 axially. In fact the axial displacement of the element 10 could in fact be effected directly by an element or something carried on the platen 4.

The taps 23 are rotated by the sleeve 30 which has a gear 45 meshing with a transmission gear 44a fixed to a gear 44b in turn meshing with a gear 40d on the nut 5.1.

Such an arrangement allows the stroke of the taps to be controlled very exactly, as it is mainly a function of the shape of the camming surface 30g. Thus the movement of the taps can be set so that they do not go much past the workpiece, for instance. In addition in this device the elimination of the threads 26 and 27 makes it possible to reduce fabrication costs and to eliminate a potentially serious occasion for wear. As with all the arrangements, the low rotation speed for the taps allows relatively small bearings to be used so that the device can be very compact, tapping holes closely adjacent one another.

I claim:

1. In combination with a press having a pair of platens movable through a predetermined distance in a predetermined direction between an outer position and an inner position, a tapping machine comprising:
    a base plate fixed to one of the platens;
    a spindle member extending along a spindle axis between the platens in the direction;
    a nut member threaded on the spindle member, one of the members being rotatable asbout the spindle axis on the base plate and the other member being fixed nonrotatably about the spindle axis on the other platen, whereby relative displacement of the platens rotates the one member in the base plate;
    an element displaceable on the base plate along an element axis but nonrotatable on the base plate about the element axis, the element having an external screwthread centered on the element axis;
    an internally threaded drive sleeve in continuous-mesh engagement with the external thread of the nut;
    at least one tap holder generally fixed relative to the element axis in the element and rotatable in the element about a respective tap axis parallel to the element axis;
    a tap fixed axially and rotationally in the holder and of a predetermined pitch;
    respective drive teeth formed on the holder;
    internal drive teeth formed on the drive sleeve and meshing with the teeth of the holder;
    rotary transmission means operatively connected between the rotary one member and the drive sleeve for synchronously rotating the holder and its tap at a predetermined tap rotation rate about the tap axis on rotation of the one member about the spindle axis; and
    axial-feed transmission means operatively connected between the rotary one member and the drive sleeve for synchronously axially advancing the element with the tap and tap holder on displacement of the platens from the outer position to the inner position through a predetermined tap stroke equal to a fraction of the press stroke and at a rate such that the tap are rotated through substantially only one revolution while being advanced through a distance equal to the pitch.

2. The tapping machine defined in claim 1 wherein the holder comprises an inner part holding the respective tap and an outer part, the inner part being displaceable axially backward along the respective tap axis relative to the respective outer part from a position with the inner part engaging axially outward against the outer part, the machine further comprising
    spring means pressing the inner part axially outward against the respective outer part with a force exceeding the opposite force created during tapping.

3. The tapping machine defined in claim 1 wherein the base plate has an auxiliary plate engageable with a workpiece to be tapped and is provided with means permitting the auxiliary plate to move relative to the base plate through a predetermined distance axially of the tap, the machine further comprising:
    spring means urging the auxiliary plate away from the base plate, the tap being engageable through the auxiliary plate with the workpiece.

4. The tapping machine defined in claim 1, further comprising
   spring means urging the holder axially outward toward a workpiece on the base plate.

5. The tapping machine defined in claim 1 wherein the rotary transmission means includes
   respective drive teeth formed on the holders, and
   a drive member in continuous-mesh engagement with the nut and formed with external drive teeth meshing with the teeth of the holders.

6. In combination with a press having a pair of platens movable through a predetermined distance in a predetermined direction between an outer position and an inner position, a tapping machine comprising:
   a base plate fixed to one of the platens;
   a spindle member extending along a spindle axis between the platens in the direction;
   a nut member threaded on the spindle member, one of the members being rotatable about the spindle axis on the base plate and the other member being fixed nonrotatably about the spindle axis on the other platen, whereby relative displacement of the platens rotates the one member in the base plate;
   an element displaceable on the base plate along an element axis but nonrotatable on the base plate about the element axis;
   an internal thread formed in the element;
   an externally threaded drive member in continuous-mesh engagement with the nut and meshing with the internal thread of the element;
   at least one tap holder generally fixed relative to the element axis in the element and rotatable in the element about a respective tap axis parallel to the element axis;
   respective drive teeth formed on the holder;
   external drive teeth formed on the drive member and meshing with the teeth of the holder;
   a tap fixed axially and rotationally in the holder and of a predetermined pitch;
   rotary transmission means operatively connected between the rotary one member and the drive member for synchronously rotating the holder and its tap at a predetermined tap rotation rate about the tap axis on rotation of the one member about the spindle axis; and
   axial-feed transmission means operatively connected between the rotary one member and the drive member for synchronously axially advancing the element with the tap and tap holder on displacement of the platens from the outer position to the inner position through a predetermined tap stroke equal to a fraction of the press stroke and at a rate such that the tap are rotated through substantially only one revolution while being advanced through a distance equal to the pitch.

7. The tapping machine defined in claim 6 wherein the holder comprises an inner part holding the respective tap and an outer part, the inner part being displaceable axially backward along the respective tap axis relative to the respective outer part from a position with the inner part engaging axially outward against the outer part, the machine further comprising
   spring means pressing the inner part axially outward against the respective outer part with a force exceeding the opposite force created during tapping.

8. In combination with a press having a pair of platens movable through a predetermined distance in a predetermined direction between an outer position and an inner position, a tapping machine comprising:
   a base plate fixed to one of the platens;
   a spindle member extending along a spindle axis between the platens in the direction;
   a nut member threaded on the spindle member, one of the members being rotatable about the spindle axis on the base plate and the other member being fixed nonrotatably about the spindle axis on the other platen, whereby relative displacement of the platens rotates the one member in the base plate;
   an element displaceable on the base plate along an element axis but nonrotatable on the base plate about the element axis;
   at least one tap holder generally fixed relative to the element axis in the element and rotatable in the element about a respective tap axis parallel to the element axis;
   a tap fixed axially and rotationally in the holder and of a predetermined pitch;
   a cam having an inclined camming surface engageable with the element;
   a spring urging the element axially back against the camming surface;
   an eccentric drive member having a surface bearing on the cam and in continuous-mesh engagement with the nut;
   rotary transmission means operatively connected between the rotary one member and the cam for synchronously rotating the holder and its tap at a predetermined tap rotation rate about the tap axis on rotation of the one member about the spindle axis; and
   axial-feed transmission means operatively connected between the rotary one member and the cam for synchronously axially advancing the element with the tap and tap holder on displacement of the platens from the outer position to the inner position through a predetermined tap stroke equal to a fraction of the press stroke and at a rate such that the tap are rotated through substantially only one revolution while being advanced through a distance equal to the pitch.

9. The tapping machine defined in claim 8 wherein the holder comprises an inner part holding the respective tap and an outer part, the inner part being displaceable axially backward along the respective tap axis relative to the respective outer part from a position with the inner part engaging axially outward against the outer part, the machine further comprising
   spring means pressing the inner part axially outward against the respective outer part with a force exceeding the opposite force created during tapping.

* * * * *